No. 872,218. PATENTED NOV. 26, 1907.
B. BOWERS.
COTTON SEED CULLER.
APPLICATION FILED MAY 23, 1907.

2 SHEETS—SHEET 1.

Witnesses

Inventor
Byron Bowers
By Victor J. Evans
Attorney

No. 872,218. PATENTED NOV. 26, 1907.
B. BOWERS.
COTTON SEED CULLER.
APPLICATION FILED MAY 23, 1907.

2 SHEETS—SHEET 2.

Inventor
Byron Bowers

Witnesses
By Victor J. Evans
Attorney

UNITED STATES PATENT OFFICE.

BYRON BOWERS, OF CANON, GEORGIA.

COTTON-SEED CULLER.

No. 872,218.   Specification of Letters Patent.   Patented Nov. 26, 1907.

Application filed May 23, 1907. Serial No. 375,278.

*To all whom it may concern:*

Be it known that I, BYRON BOWERS, a citizen of the United States of America, residing at Canon, in the county of Franklin and State of Georgia, have invented new and useful Improvements in Cotton-Seed Cullers, of which the following is a specification.

This invention relates to cotton seed cullers designed for the purpose of separating the large and fertile cotton seeds from the small degenerate and unfertile ones, and one of the principal objects of the invention is to provide simple and reliable means for quickly separating or culling the good seeds from the defective ones.

Another object of the invention is to provide a tubular separating screen or riddle having an imperforate drum extending inward into the screen and said screen and drum being rotated in opposite directions so that the seeds in passing through the separator are retarded and sufficiently agitated to permit the smaller seeds to drop through the separator tube and the perfect seeds to pass longitudinally through the same to be deposited in a discharge chute.

Still another object of the invention is to provide a cotton seed culler having a tubular separating screen or riddle having an imperforate drum extending inward into the screen, and a fan or blower for removing foreign matter and impurities from the perfect seeds as they drop into the discharge chute.

Figure 1:
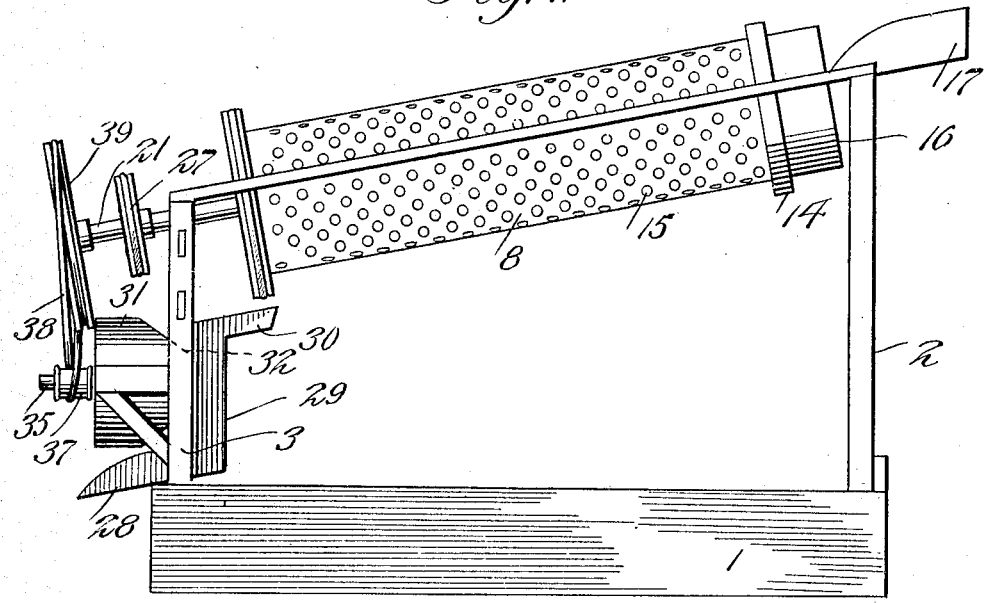
Figure 2:
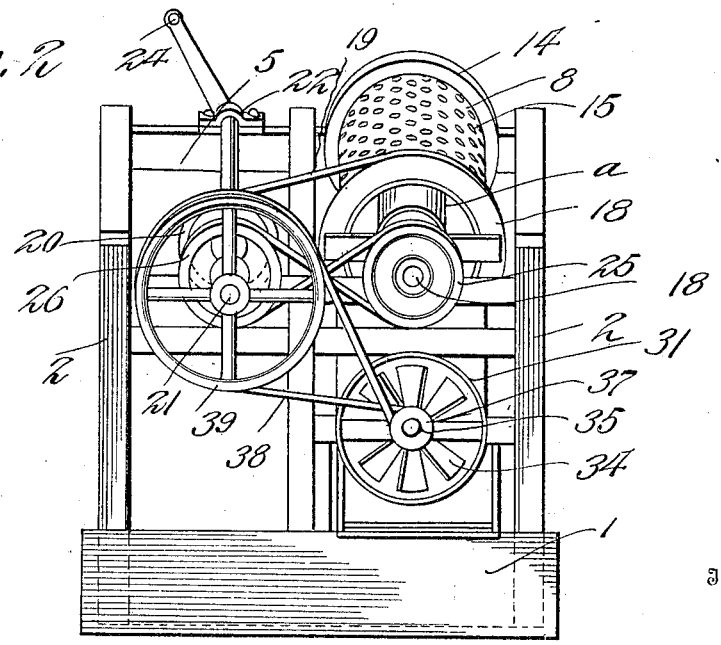
Figure 3:
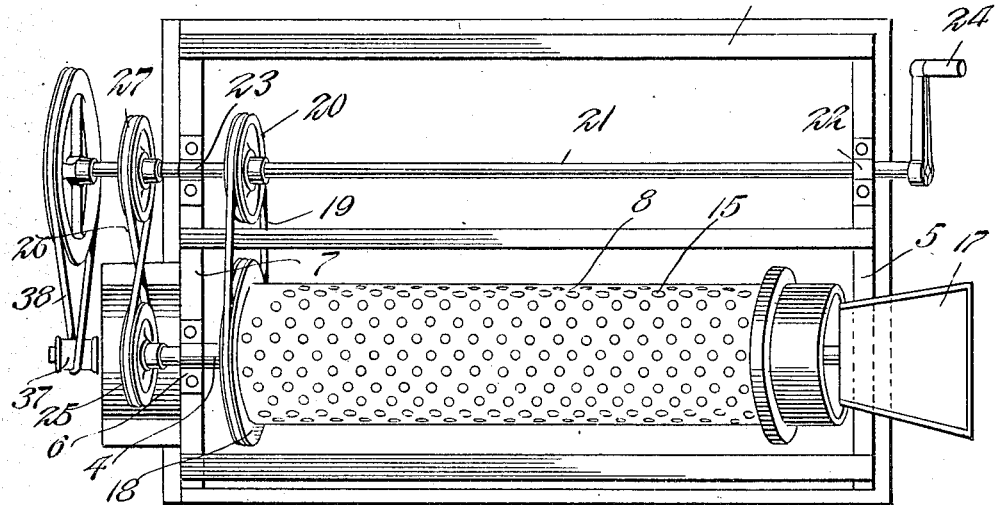
Figure 4:
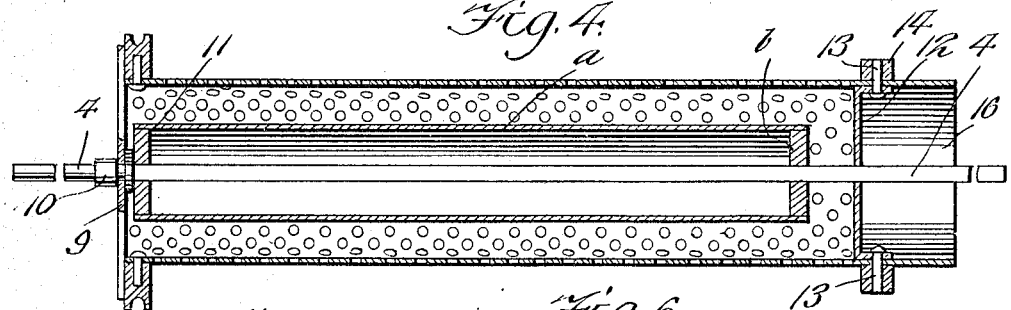
Figure 5:
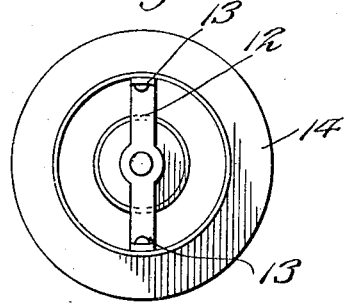
Figure 6:
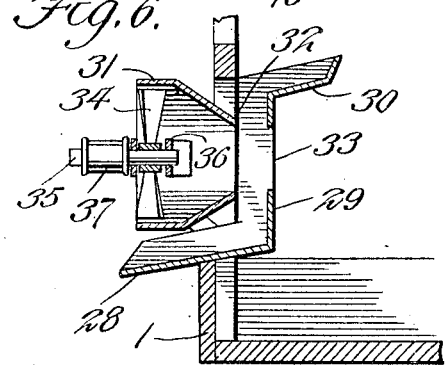

These and other objects may be attained by means of the construction illustrated in the accompanying drawings, in which:

Figure 1 is a side elevation of a cotton seed culler made in accordance with my invention. Fig. 2 is an end view of the same. Fig. 3 is a plan view of the machine. Fig. 4 is a central longitudinal section of the perforated culler tube and the imperforate drum within the same. Fig. 5 is an end view of the separator tube. Fig. 6 is a detail section of the fan or blower, and adjacent parts.

Referring to the drawings for a more particular description of my invention, the numeral 1 designates a box-like receptacle forming the base of the machine, and 2 are uprights secured to one end of the receptacle 1, while 3 are the uprights secured to the opposite end of the receptacle 1, the uprights 2 extending above the uprights 3, as shown in Fig. 1. A shaft 4 is journaled in a cross bar 5 connected to the upper ends of the uprights 2, and the opposite end of said shaft being journaled in keepers 6 secured at the upper side of a cross bar 7 extending between the uprights 3.

A tubular perforated screen or riddle 8 having secured at one end thereof a cross bar 9 is mounted to rotate freely upon the shaft 4, said shaft passing through an opening in the cross bar 9 and provided with collars 10, 11 to prevent the endwise movement of said screen upon said shaft. A cross bar 12 at the opposite end of the screen 8 is fitted inside the same and secured therein by means of bolts 13 passing through the tubular screen 8 and through a collar 14 surrounding the screen 8 at some distance inward from the outer end thereof.

The tube 8 is provided with a series of perforations 15, said perforations terminating at a point some distance from the end of the tube to provide an imperforate portion 16 at the feeding end. A feed hopper or spout 17 is secured to the cross bar 5 and the inner end of the hopper or spout terminating within the imperforate portion 16 of the screen 8. A grooved pulley 18 is secured at the opposite end of the screen 8, and a belt or band 19 passes over the grooved pulley and over a similar pulley 20 on a crank shaft 21 journaled at 22 and 23 at the top of the frame, said shaft having a hand crank 24 at the front end thereof. The shaft 4 is provided with a grooved pulley 25 at its outer end, and a belt or band 26 passes around the pulley 25, is crossed and passes around a similar pulley 27 on the outer end of shaft 21. A discharge spout 28 provided with a vertical wall 29 is supported upon the frame and at the upper end is provided with a trough 30 disposed under the discharge end of the screen 8. Connected to the frame is a fan casing 31 having a contracted inner end 32 disposed in alinement with an aperture 33 in the wall 29. A fan 34 is mounted upon a shaft 35 journaled in brackets 36 in the casing 31, said shaft 35 having a pulley 37 thereon around which a belt 38 passes, said belt passing around a pulley 39 on the end of shaft 21.

The operation of my invention may be briefly referred to as follows: The cotton seed to be culled are placed in the hopper or spout 17 and the crank 24 is rotated. The screen or separator 8 is thus rotated in one direction since it is loosely mounted upon the shaft 4 and the drum $a$ fixed to the shaft 4 by means of the heads $b$, is rotated in the opposite direction, owing to the crossed belt 26. The imperforate drum $a$ thus has the effect of retarding the seed and preventing a too rapid flow from the upper to the lower end of the screen. The defective seed being of a size to drop through the perforations 15 will fall in the box or receptacle 1, while the large and fertile seed will travel through the screen 8 and be discharged into the trough 30 from which they drop past the opening 33 and are subjected to a blast of air from the fan 34 to remove impurities and foreign matter, the seed dropping into the spout 28 thoroughly cleaned and hulled.

From the foregoing it will be obvious that a cotton seed culler made in accordance with my invention is of comparatively simple construction, will operate quickly to separate the good from the bad seed, and can be manufactured at slight cost.

Having thus described the invention, what I claim is:

1. A cotton seed culler comprising a rotary screen, an imperforate drum disposed within the screen, a shaft passing through the screen and drum, said shaft having the drum fixed thereto, cross bars on the screen journaled on said shaft, a pulley on the screen, a pulley on the shaft, a crank shaft mounted in the frame and provided with pulleys, a belt passing around the pulley on the screen and around one of the pulleys on the crank shaft, a belt or band passing around the pulley on the drum shaft and crossed and passed around the pulley on the crank shaft, and a fan blower under the discharge end of the screen.

2. A cotton seed culler comprising a tubular perforated screen, an imperforate drum within said screen, a discharge spout at one end of said screen, a fan or blower mounted in front of said discharge spout, and means for rotating the drum and screen in opposite directions simultaneously, and means for rotating the fan.

In testimony whereof, I affix my signature in presence of two witnesses.

BYRON BOWERS.

Witnesses:
J. C. BOND,
D. T. BARNES.